Feb. 16, 1932.  L. H. STEIN  1,845,359
GAUGE
Filed June 20, 1928  2 Sheets-Sheet 1
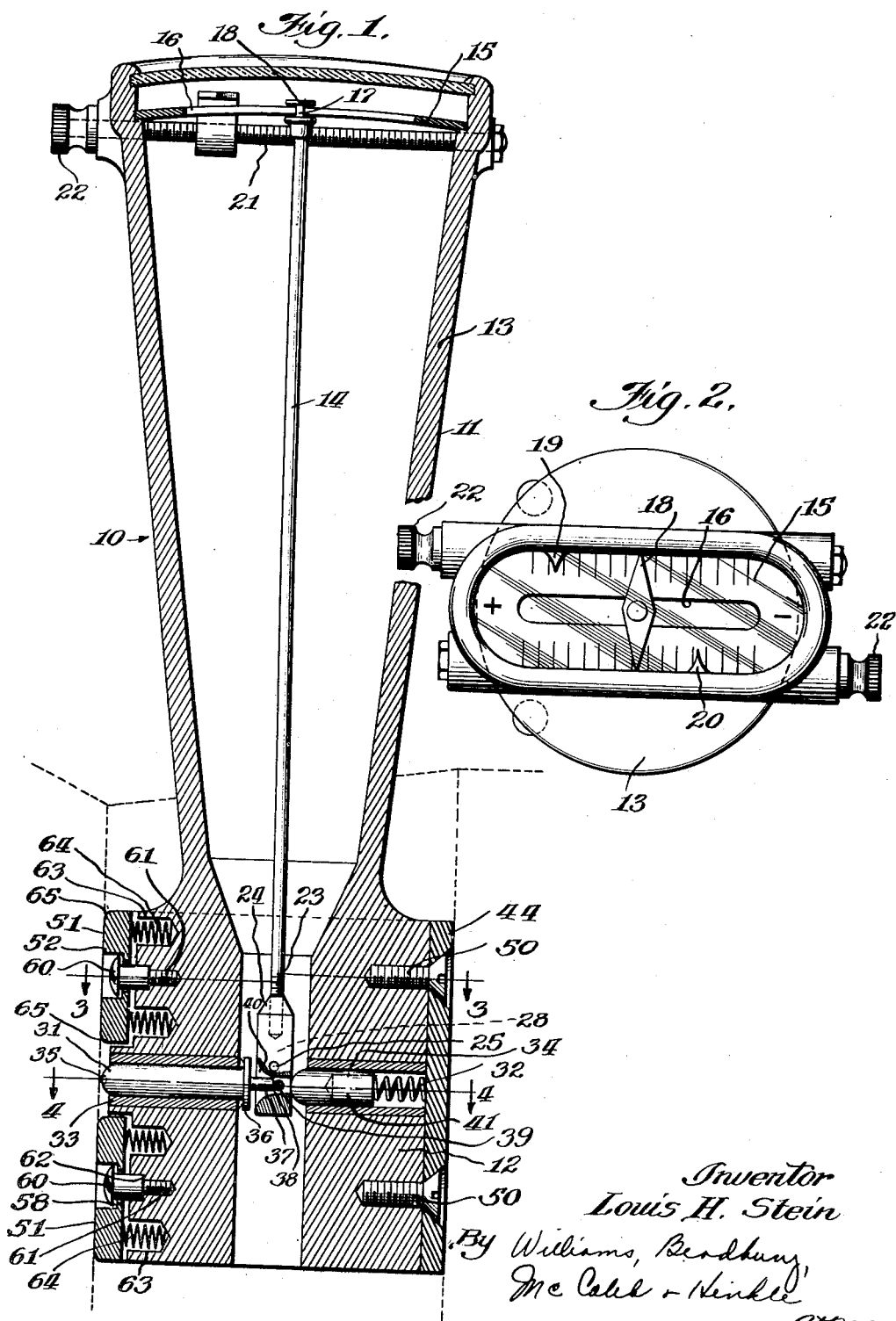
Inventor
Louis H. Stein
By Williams, Bradbury,
McCabe & Hinkle
Attys.

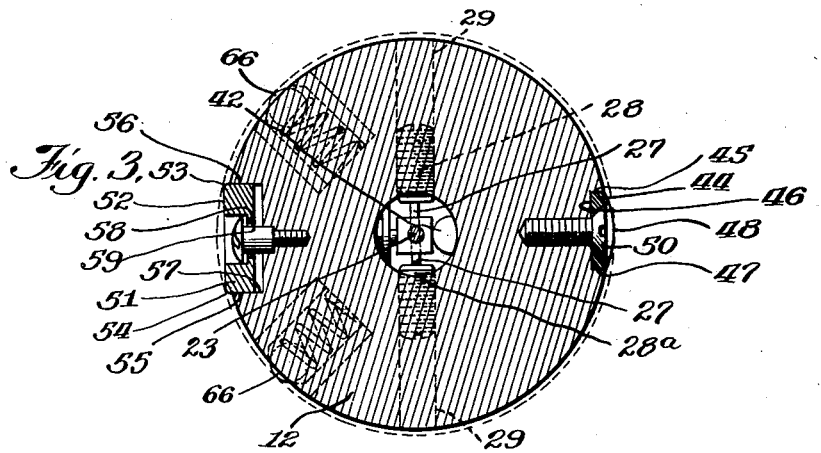
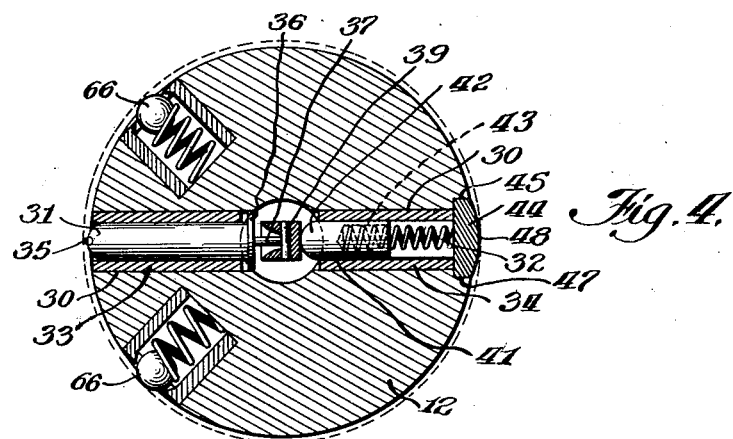
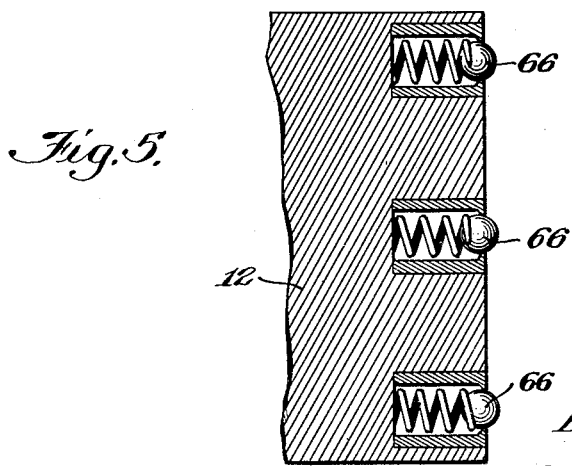

Patented Feb. 16, 1932

1,845,359

UNITED STATES PATENT OFFICE

LOUIS H. STEIN, OF CHICAGO, ILLINOIS

GAUGE

Application filed June 20, 1928. Serial No. 286,767.

The present invention relates to measuring gauges of the same general type shown in my prior Patent No. 1,619,834, issued March 8, 1927.

One of the objects of the present invention is the provision of an improved commercial form of the measuring gauge shown in my prior patent above mentioned, which is more economically manufactured and assembled and which embodies various improved forms of the elements which comprise the finished gauge.

Another object of the invention is the provision of a measuring gauge having an improved form of aligning and centering device, which is capable of accurately aligning the gauge in horizontal as well as vertical bores without substantial error.

Another object of the present invention is the provision of an improved structure for the lever of my gauge, whereby a more durable and economical form of connection is provided between the lever and the gauge contact, thereby insuring the maintenance of accuracy for a long period of time.

Another object of the invention is the provision of a novel form of resilient aligning means for gauges of the class described, comprising a reciprocable aligning member having a pair of parallel aligning surfaces, simultaneously movable into aligning position.

Other objects and advantages of my invention will appear more fully from the following description and from the accompanying drawings in which similar characters of reference indicate similar parts throughout the several views.

Referring to the single sheet of drawings accompanying the specification:

Figure 1 is a longitudinal medial cross sectional view showing the gauge in a bore to be measured;

Figure 2 is a plan view of the top or scale end of the gauge;

Figure 3 is a plan cross sectional view taken on the line 3—3 of Figure 1;

Figure 4 is a plan cross sectional view taken on the line 4—4 of Figure 1; and

Figure 5 is a fragmentary vertical section through the gauge showing the vertical alignment of the contact balls.

Referring to Figure 1, 10 indicates in its entirety my measuring gauge, which is preferably provided with a supporting body 11 having a substantially cylindrical plug portion 12 at its lower end, and a hollow downwardly tapering casing 13 at its upper end for receiving an indicating lever 14. The upper portion of the gauge casing may be substantially as in my prior patent above mentioned, being provided with a scale 15 having an elongated slot 16, adapted to receive the reduced end 17 of the indicating lever 14 bearing a transverse pointer 18. The scale 15 is also provided with the limit pointers 19 and 20 reciprocably mounted at opposite sides of the scale 15 upon threaded rods 21 adapted to be rotated by knurled heads 22 to adjust the limit pointers.

All of the details at the upper end of the gauge may be substantially as shown in the prior patent above mentioned, and consequently these parts will not be described in detail herein.

The hub 24 may be provided with a transverse bore 25 which is adapted to receive an eccentrically mounted pin 27 carried by a screw plug 28. At the opposite side of the plug portion 12 of the gauge is a similar bore adapted to receive a set screw 28—a which engages the end of the pin 27 and holds it in any adjusted position. It will thus be observed that the location of the fulcrum of the hub 24 may be adjusted by rotating the screw plug 28 and securing it in adjusted position by the set screw 28—a.

The plug portion 12 of the gauge is also provided with a bore 30 extending diametrically across the base of the gauge at substantially right angles to the bore 29 and adapted to receive the contact point 31 of the gauge, and the spring 32. The bore 30 is preferably lined with a pair of metal tubes 33 and 34, and the tube 33 slidably supports a substantially cylindrical contact member 31, bearing a diamond point 35 in its outer end. The diamond point 35 and outer end of the contact member 31 are curved so as to be cammed inward by the wall of the bore when the gauge is inserted in a bore, and the inner end of the contact member may be provided with an annular flange 36 adapted to engage the tube 33 to limit the outward movement of the contact member.

The contact member is also provided with a reduced portion 37 adapted to project into the hub 24 and provided with a flat end 38 for contacting with the side of a pin 39 carried by the hub 24. The hub 24 is preferably bored out as at 40 to a point past the axis of the hub, and a hardened steel pin 39 is set in the hub 24 substantially parallel to its pivot member 27. The pin 39 may be constructed of hardened steel, and it is adapted to contact with the inner end of the contact member 31, thereby providing engaging members which are capable of long use without substantial wear.

The amount of angular movement of the pin 39 in the operation of the gauge is extremely small, and the relative sliding motion between the pin 39 and the end 37 of the contact member is practically nil, but in order to reduce the sliding movement between these parts and to eliminate the effect of changes of radius, I prefer to locate the pin 39 so that its contacting surface is substantially in the longitudinal axis of the lever 14.

The lever 14 is also provided with means for maintaining the engagement of the pin 39 with the end 37 of the contact member, comprising a spring 32 located within the tube 34 and resiliently engaging a substantially cylindrical plunger 41. The plunger 41 is provided with a rounded inner end 42 engaging the adjacent side of the hub 24, and the plunger is provided with an axial bore 43 for seating the end of the spring 32. The outer end of the spring 32 may react against the shoe 44, which comprises one of the aligning members for the measuring gauge.

The shoe 44 may comprise a hardened steel strip of substantially rectangular shape upon the three sides 45, 46 and 47, but having an outer curved surface 48 formed with a radius of less length than the radius of any bore to be measured by the gauge. That is, the surface 48 is more curved than the inner surface of a bore to be measured by the gauge, so that there is a single line of contact between the wall of the bore and the aligning member 44 at their common point of tangency. The aligning member 44 may be set in a groove of substantially complementary form and secured in place by a plurality of screws 50 which are countersunk into the aligning member 44 so that the heads are below the exterior surface.

Located at a point diametrically opposite the aligning member 44 are one or more resilient aligning members or shoes 51 which are provided with an exterior surface 52 which may be a plane surface or a surface of greater curvature than the curvature of the bore to be measured in such manner that the two corners 53 and 54 are adapted to come into contact with the walls of a circular bore. The shoes 51 may consist of hardened steel members having a substantially rectangular cross section with flat sides 55 and 56 which are adapted to slidably engage the walls of a groove 57, of complementary form.

The shoes 51 are provided with centrally located apertures 58 having counterbores 59 adapted to receive the stem and head of the screw bolts 60 passing through the shoes and threaded into the body of the gauge.

The screw bolts 60 are preferably provided with a reduced threaded end 61 forming a shoulder 62 adapted to limit the inward threading of the bolt so as to maintain the bolt in a predetermined position, and the head 59 is located sufficiently below the surface of the shoe so that it will not project from the shoe even when the shoe is in its innermost position.

Upon opposite sides of the screw bolts 60, preferably above and below, the body of the gauge is provided with bores 63 adapted to receive helical compression springs 64 which urge the shoes 51 outward into engagement with the heads of the bolts 60. The shoes are also provided with slightly rounded upper and lower edges 65 in such manner that these rounded surfaces are capable of camming the shoes inward when the gauge is inserted in a bore.

The apertures 58 about the bolts 60 are slightly larger than the stems of the bolt so that the shoes 51 are adapted to tilt slightly in a vertical plane, but due to the sliding engagement between the sides 55 of the shoes and the walls of the groove 57, the shoes are incapable of rotating about a vertical axis, or tilting laterally.

It will thus be observed that when the gauge is inserted into a bore, the lower edge of the shoe will be cammed inward, the shoe tilting about a horizontal axis, and as the gauge progresses, the entire shoe will be forced back, but will be held in resilient engagement with the sides of the bore by the springs 64. As the shoes are incapable of rotation upon the vertical axis, the two lines of contact, 53 and 54, provided by the outer vertical edges of the shoes, will be simultaneously projected from the body of the gauge by the springs 64.

Should one of the edges 53 or 54 engage before the other, the tendency of the gauge will be to slide laterally in the bore until both edges 53 and 54 engage the sides of the bore, and it will thus be observed that the resilient shoes 51, in cooperation with the diametrically opposite aligning member 44 are capable of accurately aligning the gauge in the bore.

I desire it to be understood that in certain types of gauges the aligning shoes 51 may be employed without auxiliary aligning means such as the spring pressed balls 66. In other types of gauges I find it desirable to employ both forms of aligning devices and the gauge may be provided with a pair of rows of spring pressed balls 66 preferably located at equal angular displacements from the aligning member 44. The details of the spring pressed balls 66 may be substantially as set forth in my prior patent above mentioned, and consequently they will not be further described here.

The operation of my gauge is as follows. When the gauge is inserted in a bore, the aligning shoe 51 is cammed inward but is maintained in engagement with the walls of the bore by means of the springs 64. If the spring pressed balls 66 are also used, they also engage the walls of the bore and tend to force the aligning member 44 into engagement with the opposite wall of the bore. As this aligning member has a single line of contact with the side of the bore, the gauge body will automatically seek an axial position within the bore, and the contact point 31 will take a position determined by the size of the bore.

The contact member 31 being in engagement with the lower end of the lever 14, the pointer 18 carried by the lever 14 will indicate upon the scale 15 the size of the bore, and by means of the limit pointers 19 and 20, the operator may readily determine whether the bore is within the limits of tolerance permitted. The gauge may be rotated within the bore and the exact diameter of the bore will be indicated at every point so that the operator may see whether the bore is accurately cylindrical at any point.

The aligning shoes 51 are of particular importance where it is desired to use the gauge in horizontally located bores, as the lines of contact 53 and 54 upon the shoes are simultaneously projected by the springs into engagement with the walls of the bore, and it is impossible for the gauge to drop down toward the lower side of the bore as might be the case where the springs of certain spring pressed balls had become weak.

It will thus be observed that I have invented a novel form of aligning device for my measuring gauge which is capable of simultaneously projecting two spaced lines of contact into engagement with the wall of the bore, and my improved gauge is also provided with a novel structure for the lower end of the indicating lever which is easy to manufacture, and capable of long use without substantial wear.

While I have illustrated and described a specific embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a measuring gauge for cylindrical bores, the combination of a supporting body having a fixed aligning means carried on one side with a movable aligning means carried on the opposite side of said body, said latter means comprising a movable metallic shoe having parallel sides, said body having an axially extending socket with complementary walls to permit radial reciprocation of said shoe, said body having a diametrical bore therethrough, a contact member in one end of said bore in alignment with said movable aligning means, a spring in the other end of said bore operable to urge said contact member outwardly, and means for limiting the outward movement thereof.

2. In a measuring gauge for cylindrical bores, the combination of a supporting body having a fixed aligning means carried on one side with a movable aligning means carried on the opposite side of said body, said latter means comprising a movable metallic shoe having parallel sides, said body having an axially extending socket with complementary walls to permit reciprocation of said shoe, said shoe being provided with a curved end to be cammed inward in the insertion of the gauge in a bore, said body having a diametrical bore therethrough, a contact member in one end of said bore in alignment with said movable aligning means, a spring in the other end of said bore operable to urge said contact member outwardly, and means for limiting the outward movement thereof.

3. In a measuring gauge for cylindrical bores, the combination of a supporting body having a fixed aligning means carried on one side with a movable aligning means carried on the opposite side of said body, said latter means comprising a movable metallic shoe having parallel sides, said body having an axially extending socket with complementary walls to permit radial reciprocation of said shoe, said shoe being provided with a curved end to be cammed inward in the insertion of the gauge in a bore, a headed member passing through said shoe to retain it in place upon said body, a plurality of springs for urging the shoe outward from said body, said body having a diametrical bore therethrough, a contact member in one end of said bore in alignment with said movable aligning means, a spring in the other end of said bore operable to urge said contact member outwardly, and means for limiting the outward movement thereof.

4. In a measuring gauge for cylindrical bores, the combination of a supporting body, a contact member movably supported therein, a fixed aligning means carried on one side and adapted to make a single line contact with a cylinder wall, a movable aligning means on the opposite side of the body adapted to make two line contacts with said cylinder wall, and movable means adapted to exert pressure on the cylinder wall between said aligning means, tending to locate the aligning means symmetrically in the cylinder.

5. In a measuring gauge for cylindrical bores, the combination of a supporting body, a fixed aligning means carried on one side of the body and adapted to make a single line contact with a cylinder wall, a movable aligning means on the opposite side of the body adapted to make two line contacts with said cylinder wall, a contact member movably supported in the body in the axial plane of the aligning means, and movable means adapted to exert a pressure on the cylindrical wall between said aligning means, tending to locate the aligning means symmetrically in the cylinder.

6. In a measuring gauge for cylindrical bores, the combination of a supporting body having a groove therein with plane sides, a fixed aligning means carried on one side of the body and adapted to make a single line contact with the cylinder wall, a movable aligning member having parallel longitudinal sides, mounted in the groove in the body to permit radial movement of the aligning member and prevent transverse movement thereof, said aligning member being adapted to make two line contacts with said cylinder wall, resilient means forcing said aligning member outwardly, a contact member supported for radial movement in the body and located in the axial plane of the aligning member, and movable means adapted to exert pressure on the cylinder wall between said aligning members, tending to locate the aligning means symmetrically in the cylinder.

In witness whereof, I hereunto subscribe my name this 1 day of June, 1928.

LOUIS H. STEIN.